United States Patent [19]

Charles

[11] Patent Number: 5,495,909

[45] Date of Patent: Mar. 5, 1996

[54] AUTOMOTIVE VEHICLE ENGINE BAY VENTILATION BY DUCTED-FAN-OPERATED EJECTOR

[75] Inventor: Herbert N. Charles, Chatham, Canada

[73] Assignees: Siemens Automotive Limited; Siemens Aktiengesellschaft, both of Germany

[21] Appl. No.: 24,884

[22] Filed: Mar. 1, 1993

Related U.S. Application Data

[63] Continuation of Ser. No. 637,098, Jan. 3, 1991, abandoned.

[51] Int. Cl.$^6$ ..................................................... B60K 11/06
[52] U.S. Cl. ........................................ 180/68.1; 123/41.66
[58] Field of Search .............................. 123/41.49, 41.66, 123/41.7, 41.48; 180/68.1, 68.2, 68.4; 165/51, 127

[56] References Cited

U.S. PATENT DOCUMENTS

| | | | |
|---|---|---|---|
| 1,766,900 | 6/1930 | Griswold | 123/41.66 |
| 1,856,772 | 5/1932 | Masury et al. | 180/68.2 |
| 2,511,549 | 6/1950 | Simi | 180/68.2 |
| 2,901,052 | 8/1959 | Rabe et al. | 180/68.1 |
| 4,086,976 | 5/1978 | Holm et al. | 180/68.1 |
| 4,265,332 | 5/1981 | Presnall et al. | 180/68.1 X |
| 4,388,804 | 6/1983 | Bushmeyer | 180/68.1 X |
| 4,940,100 | 7/1990 | Ueda | 180/68.1 |
| 4,979,584 | 12/1990 | Charles | 180/68.1 |

*Primary Examiner*—Margaret A. Focarino
*Assistant Examiner*—Michael Mar
*Attorney, Agent, or Firm*—George L. Boller

[57] ABSTRACT

A radiator and condenser bridge the front of an engine bay of an automotive vehicle. An electric motor powered ducted fan is disposed directly behind and in enclosing relation to the radiator and condenser to draw air through the radiator and condenser and convey the hot effluent to a location outside the engine bay. While the bay is intended to be ventilated by ram air, any hot spots that may occur in or adjacent the bay, due to an insufficiency or complete lack of ram air, may be ventilated by providing an ejector in association with the ducted fan system. Effluent from the ducted fan is conveyed through the ejector, which by means of venturi effect, creates a relatively low pressure zone. A relatively higher pressure zone at a hot spot is connected by means of a ventilating conduit to the relatively lower pressure zone of the ejector. A ventilating flow is induced through the ventilating conduit and entrained with the effluent for ensuing discharge to a location outside the bay.

14 Claims, 3 Drawing Sheets

AUTOMOTIVE VEHICLE ENGINE BAY VENTILATION BY DUCTED-FAN-OPERATED EJECTOR

This is a continuation of application Ser. No. 07/637,098 filed on Jan. 3, 1991, now abandoned.

FIELD OF THE INVENTION

This invention relates to the ventilation of the engine bay of an automotive vehicle.

BACKGROUND AND SUMMARY OF THE INVENTION

Most of the automobiles that are in use today have the engine bay located at the front of the vehicle. Typically an internal structural cross-member bridges the front of the bay and supports a radiator that is a part of the engine's cooling system. When the vehicle is equipped with air conditioning, a condenser mounts in front of the radiator. The radiator and condenser are cooled by air that passes through them, the air either being forced through the radiator and condenser by ram air effect when the vehicle is in forward motion, and/or by being drawn through the radiator and condenser by a fan or fans located directly behind the radiator and condenser. As a result, the engine bay is ventilated by air that has been heated by the radiator and condenser. Before this air leaves the engine bay, it is further heated by the heat emitted directly by the engine. Consequently, elevated temperatures can occur in the engine bay and at other locations that are exposed to heated air from the engine bay. These elevated temperatures may be sufficiently high to create thermally induced problems in certain areas or components of an automotive vehicle.

Commonly assigned, allowed U.S. patent application Ser. No. 07/357,509, filed May 25, 1989, now U.S. Pat. No. 4,979,584, in the name of Herbert N. Charles, discloses a new and unique arrangement for ventilating an engine bay to reduce temperatures. The invention of that patent application involves the use of a ducted fan system to draw cooling air through the radiator and condenser and to convey the hot effluent from the radiator and condenser through a conduit that empties to a location that is outside the engine bay so that the engine bay is not ventilated by the hot effluent. Apertures are provided in the structural cross-member that supports the radiator/condenser heat exchange structure so that the engine bay can be ventilated by ambient ram air when the vehicle is in forward motion. Accordingly, an arrangement of that type provides a means for obtaining significant temperature reductions in the engine bay in comparison to conventional installations where the engine bay is ventilated by hot effluent from radiator/condenser heat exchange structure.

It has now been discovered that a ducted fan system like that just described can be used to further enhance the ventilation of the engine bay by the incorporation of an ejector into the ducted fan system at a location downstream of the fan. The effluent from the radiator/condenser heat exchange structure is conducted through the ejector, and the ejector is effective, under certain conditions of operation of the ducted fan, to cause the effluent that passes through the ejector to create a relatively lower pressure zone where the pressure is less than that of a relatively higher pressure zone of the engine bay or of a location adjacent the engine bay that is exposed to heat from the engine bay. The relatively lower pressure zone of the ejector is placed in communication with the relatively higher pressure zone of the engine bay, or adjacent location, for example by means of a ventilating conduit that extends from the relatively higher pressure zone of the engine bay or adjacent location and tees into the ducted fan system at the relatively lower pressure zone of the ejector. As a result, a flow is induced in the ventilating conduit, and that flow draws air from the relatively higher pressure zone of the engine bay or adjacent location into the ejector where the flow entrains with the effluent passing through the ducted fan system to be ultimately discharged from the ducted air system along with the effluent to a location outside the engine bay where the discharge of the effluent is acceptable. It is contemplated that a suitably designed ejector and ventilating conduit can induce in the ventilating conduit flows of as much as about 10% to 15% of the effluent flow without appreciable loss of efficiency in the operation of the ducted fan system. Consequently, the invention now makes it possible to enhance the ventilation of the engine bay, and especially to enhance the ventilation of hot spots in the engine bay or adjacent locations that are exposed to heat from the engine bay.

Certain components of an automobile that are typically within the engine compartment, fuel lines and batteries for instance, may be located where there is insufficient ventilation to provide acceptable cooling for these components. If such is the case, the present invention can provide a very effective solution which comprises designing an ejector into the ducted fan system, and running a ventilating conduit from the hot spot to the ejector. The solution is especially advantageous because the ejector and the ventilating conduit contain no moving parts. The ejector can be fabricated by conventional plastic molding techniques, and the ventilating conduit can be fabricated in any of a number of conventional ways, such as using flexible or rigid hose or tubing. One of the disclosed embodiments of the invention contemplates an especially efficient use of both materials and available space within the engine bay by integrating the ejector with the ducted fan scroll.

The foregoing features, advantages and benefits of the invention, along with additional ones, will appear in the ensuing description and claims which should be considered in conjunction with the accompanying drawings. The drawings disclose a presently preferred embodiment of the invention according to the best mode contemplated at the present time in carrying out the invention.

DESCRIPTION OF THE PREFERRED EMBODIMENT

Figure 1:
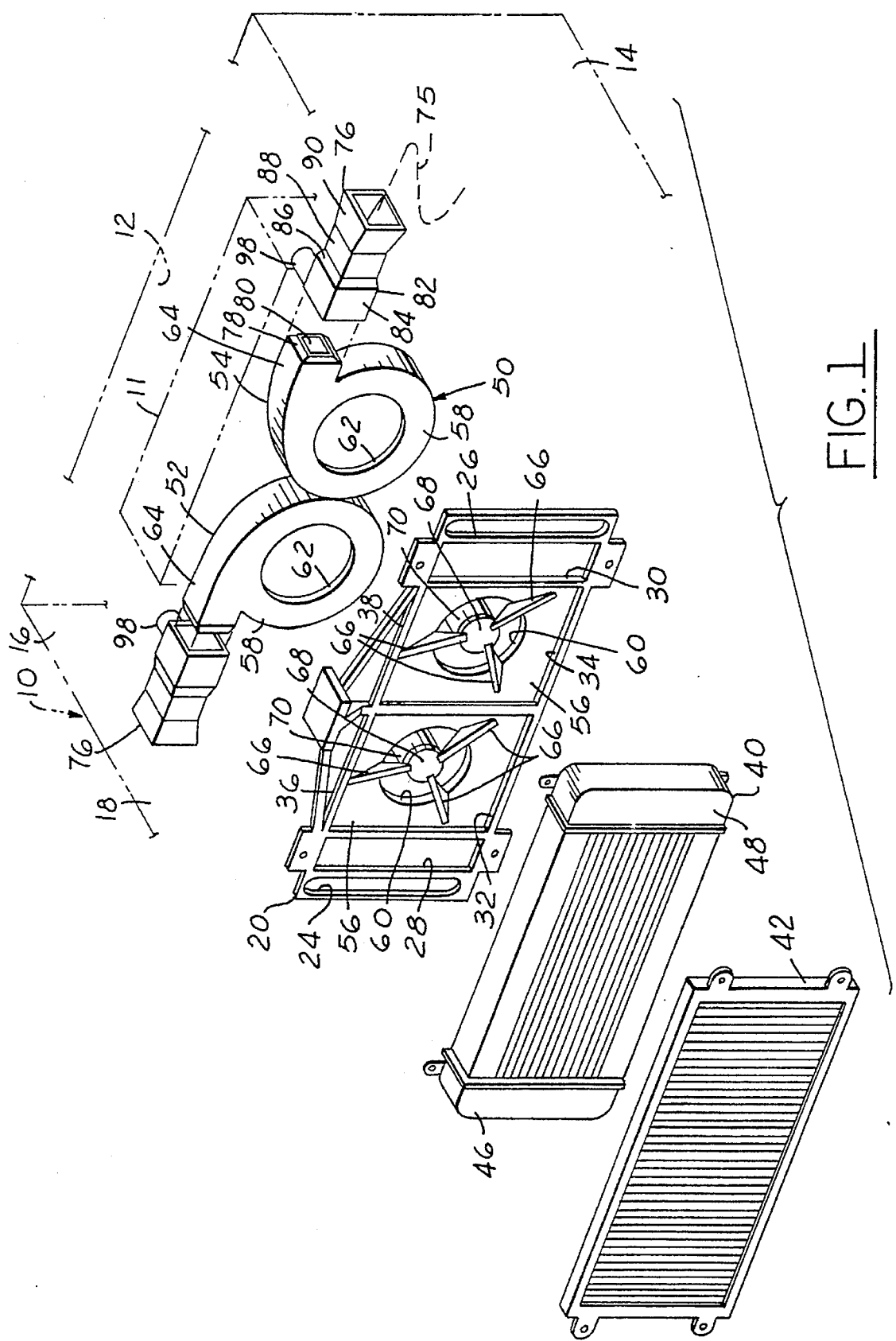
FIG. 1 is an exploded perspective view of a representative engine bay installation in accordance with certain principles of the invention.
Figure 2:
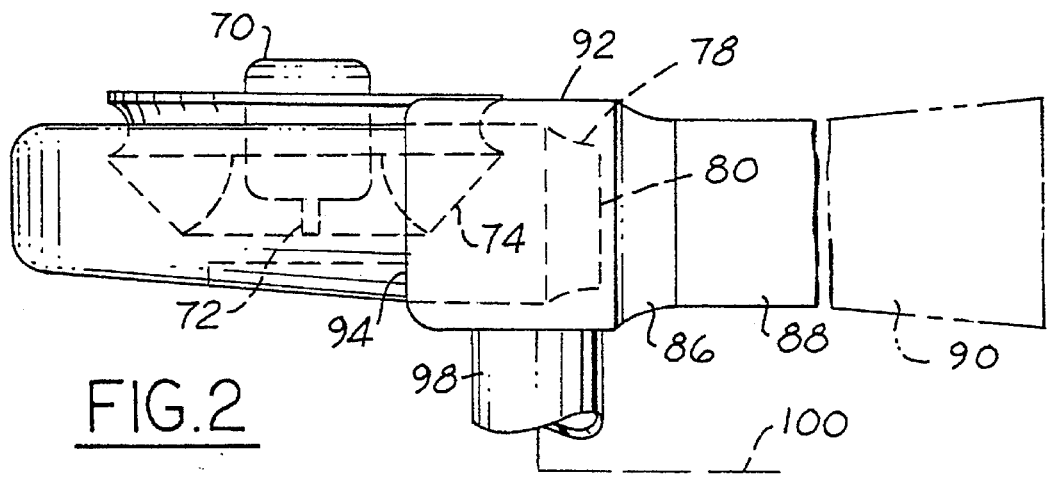
FIG. 2 is a top plan view, on an enlarged scale, of a portion of FIG. 1 showing the several parts in assembled relation.
Figure 3:
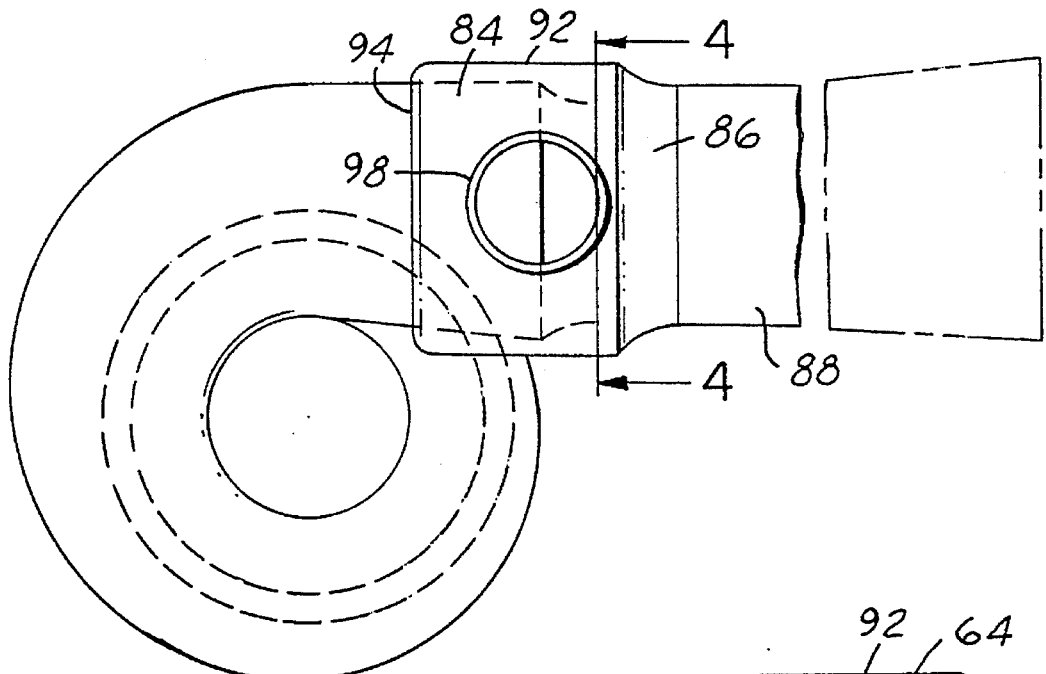
FIG. 3 is an elevational view taken in the direction of arrows 3—3 in FIG. 1.
Figure 4:
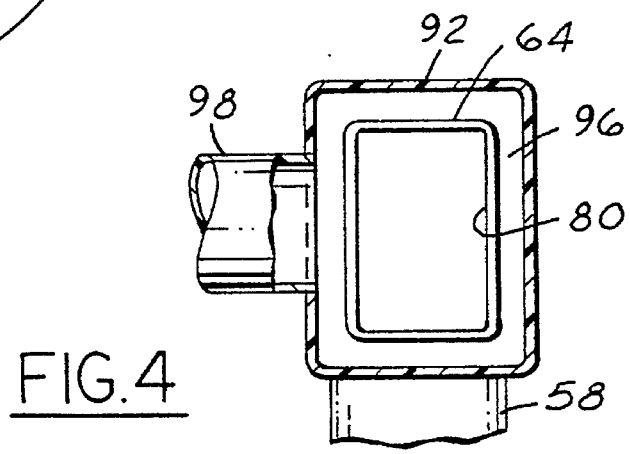
FIG. 4 is a transverse cross-sectional view taken in the direction of arrows 4—4 in FIG. 1.

The drawing FIGS. 1–4 show a representative configuration for an automotive vehicle engine bay ventilation according to the invention. The engine bay is represented by the numeral 10 and is schematically portrayed in FIG. 1. It contains an engine 11 and is bounded at the rear by a dash panel 12, at the sides by inner fenders 14 and 16, and at the top by a hood 18, all schematically portrayed. A transverse structural cross-member 20 that joins inner fenders 14 and 16 bridges the front of bay 10. Cross-member 20 has an open area comprising a number of openings 24, 26, 28, 30, 32, 34, 36, and 38 that pass through cross-member 20 from front to rear. Heat exchange structure is disposed in front of and is mounted on cross-member 20. This heat exchange structure comprises a radiator 40 for engine 11, and when the vehicle has air conditioning, it further comprises a condenser 42. When the several parts are in assembly, end tanks 46, 48 of radiator 40 fit to the vertically elongated openings 28, 30 so that rearwardly projecting tubes (not visible in FIG. 1) on the end tanks can project through the respective openings to receive hoses (not shown) coming from engine 11.

Ducted fan structure, 50 generally, and comprising two ducted fans 52, 54, is cooperatively associated with cross-member 20, radiator 40 and condenser 42. Each ducted fan comprises an inlet cone 56 and a scroll 58. The ducted fans are disposed directly behind the core areas of the radiator and condenser. Each cone 56 has an inlet opening 59 that matches the corresponding openings 32 and 34 of structural cross-member 20. Furthermore, each cone has a circular outlet opening 60 that is generally centrally located with respect to the inlet opening 58. Each scroll 58 comprises a circular inlet opening 62 that fits to the circular outlet opening 60 of the corresponding inlet cone. Furthermore, each scroll has a scroll outlet 64 that is disposed to the side. Each inlet cone further contains a set of three struts 66 that support a motor mount 68 centrally of each outlet opening 60. An electric motor 70, typically a conventional D.C. motor, is fitted to each mount and projects rearwardly to fit inside the corresponding scroll when the parts are assembled. The shaft 72 (FIG. 2) of each motor points to the rear and a fan, or wheel, 74 (FIG. 2) is disposed within the corresponding scroll and attached to shaft 72. With this arrangement the ducted fan structure is disposed on the engine bay side of the heat exchange structure and encloses the engine bay side of the heat exchange structure.

It is contemplated that cross-member 20 can be fabricated by any of several conventional techniques. For example, it could be a stamped metal part or it could be a moulded structural plastic part. It is also possible for inlet cones 56 to be integrally formed with cross-member 20 and for struts 66 and motor mount 68 to be integrally formed with inlet cones 56. Scrolls 58 are fabricated in accordance with conventional techniques, and for convenience in accessing the motors and fans, may be designed to have an upper part that can be disassembled from a lower part. The ducted fans are preferably of a type that is commonly known as a mixed flow fan.

Whenever fans 74 are operated by energizing motors 70, they are effective to draw air through the core areas of condenser 42 and radiator 40 so that the air passes through inlet cones 56 and through scrolls 58 to be discharged from the scrolls at the scrolls' outlets 64. The ducted fan system further includes conduits 75 leading from the respective scroll outlets 64 for conveying the effluent to locations outside the engine bay, for example conveying the effluent through the inner fender walls 14, 16 where it empties into the wheel wells.

In accordance with principles of the invention, respective ejectors 76 are incorporated into the ducted fan system downstream of each fan 74. The embodiments of the ejectors of FIGS. 1–4 are integrated with the ducted fan scrolls 58 and conduits 75 in the following manner. Each scroll outlet 64 comprises a convergent section 78 just ahead of the generally rectangular outlet opening 80. Each ejector 76 comprises a part 82 that fits over the corresponding scroll outlet 64. Part 82 comprises a connecting section 84 that fits onto and joins with scroll outlet 64, a convergent section 86 that extends from connecting section 84 to a pressure recovery section 88, and an outlet section 90 that extends from pressure recovery section 88. Outlet section 90 may be shaped to fit directly to a portion of the automotive vehicle, such as to the corresponding inner fender wall for discharging effluent through the wall and into the wheel well outside the engine bay, or it may connect to a separate piece of hose, tubing or conduit that serves to convey the effluent to any suitable location outside engine bay 10. The portion of outlet section 90 immediately adjacent pressure recovery section 88 may be somewhat divergent.

Connecting section 84 comprises a side wall 92 of generally rectangular shape and somewhat larger than scroll outlet 64. It also comprises an end wall 94 that fits onto the scroll in a sealed manner. The cooperative relationship between connecting section 84 and scroll outlet 64 defines an annular space 96 which surrounds the scroll outlet. The scroll outlet opening 80 is located just ahead (i.e., upstream) of convergent section 86. When the ducted fan is operated, the flow that exits scroll outlet 64 creates within the ejector by means of venturi effect a relatively lower pressure zone that extends to annular space 96. A nipple 98 tees into the ejector at side wall 92. One end of a ventilating conduit 100 is fitted to nipple 100 and the other end is disposed at a hot spot in or adjacent engine bay 10. The result is that a ventilating flow is induced in conduit 100 to draw ambient air from the location of the hot spot into the ejector where the ventilating flow entrains with the effluent from the ducted fan for ultimate discharge from engine bay 10 via conduit 75. Consequently, the hot spot experiences ventilation because the ejector effectively sucks ambient air away from the hot spot.

Figure 5:
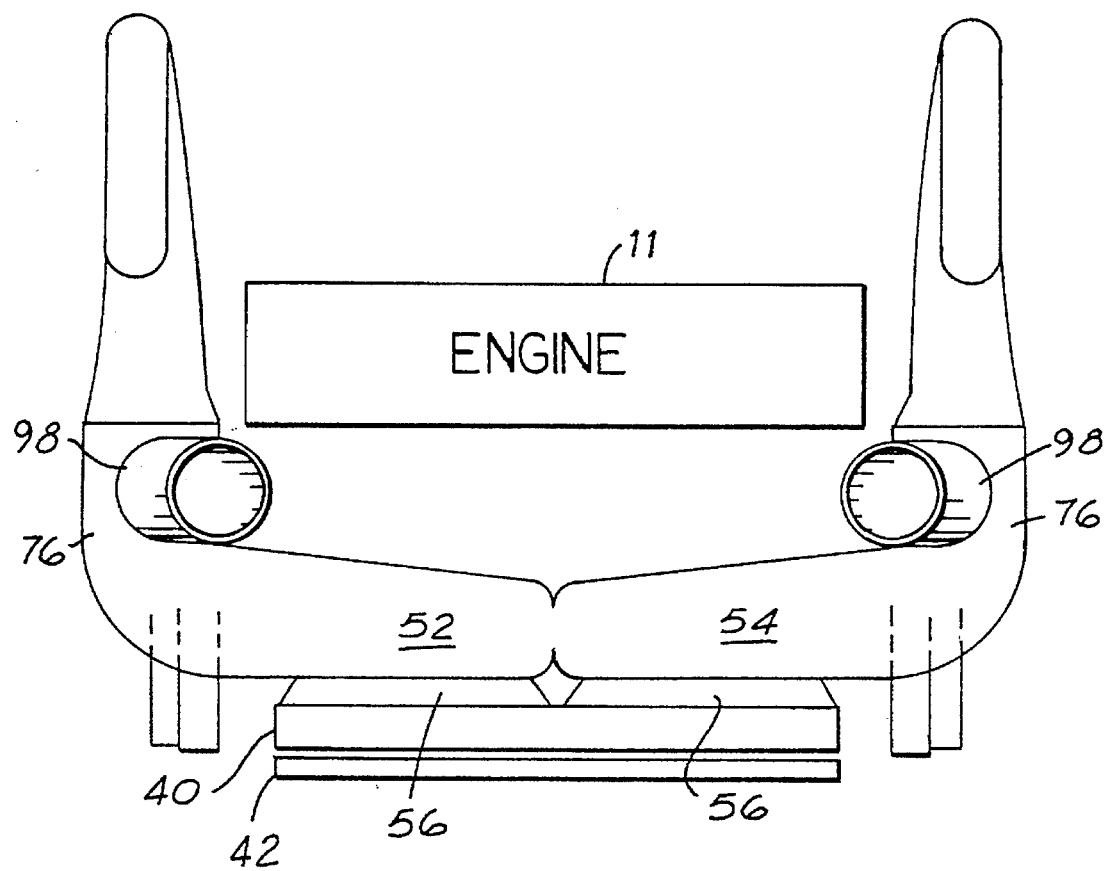
FIG. 5 is a top plan view of another representative engine bay installation.

FIG. 5 presents another embodiment in which like numerals designate like parts. The FIG. 5 embodiment comprises the ejectors in spaced downstream relation to the ducted fans's scrolls. The ventilating conduits to the ejectors serve to draw air from the vicinity of the engine's exhaust manifold.

When the vehicle is in forward motion, ram air is forced through the condenser, the radiator and the ducted fan system if the fans are not being driven by motors 70. At the same time, ram air is being forced through the vertically elongated openings 24, 26, and the horizontally elongated openings 36, 38 to ventilate the engine bay. The air that passes through these openings 24, 26, 36 and 38 is not heated by the condenser or radiator, and therefore the engine bay is ventilated with ambient air, not with effluent from the condenser and radiator. If the ram air is insufficient to cool the radiator and condenser, motors 70 are operated.

To the extent that certain hot spots are found to exist in or adjacent the engine bay, the use of ejectors to ventilate the hot spots can be beneficial. Although in certain instances it may be sufficient to cool the radiator and condenser, ram air flow alone may be insufficient to make the ejectors effective to induce ventilation of the hot spots, in which case operation of motors 70 to drive fans 74 will be called for. Certain automobile designs may not even incorporate any bay ventilating openings in cross-member 20, and in such designs the ducted-fan-operated ejectors of the present invention can be especially beneficial in alleviating hot spots.

The specific design of any system embodying principles of the invention is conducted using conventional engineering computational techniques relating to ducted fan design, to the flow of gases through conduits, and to venturi design. While a presently preferred embodiment of the invention has been illustrated and described, it is to be appreciated that the inventive principles may be practiced in other equivalent embodiments which fall within the scope of the following claims.

What is claimed is:

1. In an automotive vehicle which has an engine bay containing an engine for powering the vehicle, heat exchange structure which bridges a portion of said engine bay and provides cooling for said engine, a ducted fan system disposed on the engine bay side of said heat exchange structure and comprising a ducted fan structure that encloses the engine bay side of said heat exchange structure for drawing air through said heat exchange structure and a conduit structure that conveys the effluent from the ducted fan structure to a location outside the engine bay, the improvement which comprises said ducted fan structure comprising a scroll having an outlet via which the drawn air is delivered to said conduit structure, said improvement further comprising ejector means which is associated with said ducted fan outlet and said conduit structure such that effluent from said ducted fan outlet that passes to said conduit structure is caused to pass through said ejector means, said ejector means comprising means effective under certain conditions of operation to cause the flow of effluent therethrough to create a relatively lower pressure zone within said ejector means wherein the pressure is less than that of a relatively higher pressure zone that lies within a region that is exterior to the engine and that consists of that portion of said engine bay surrounding the engine and a location exteriorly adjacent said engine bay which is exposed to heat from said engine bay, said ejector means comprising means providing a tee connection to said relatively lower pressure zone, and ventilating conduit means connected to said tee connection communicating said relatively higher pressure zone that lies within said region to said relatively lower pressure zone within said ejector means such that the pressure differential existing between said relatively higher pressure zone and said relatively lower pressure zone is effective to induce a ventilating flow from said relatively higher pressure zone through said ventilating conduit means to said ejector means for entrainment with effluent passing through said ejector means and ensuing discharge to a location outside said engine bay.

2. The improvement set forth in claim 1 in which said ejector means comprises a convergent section downstream of said connecting section and a pressure recovery section downstream of said convergent section of said ejector means.

3. The improvement set forth in claim 2 in which said convergent section of said scroll outlet terminates in an outlet opening and said convergent section of said ejector means is downstream of said outlet opening.

4. The improvement set forth in claim 2 in which said ejector means comprises a divergent outlet section downstream of said pressure recovery section.

5. The improvement set forth in claim 4 in which said tee connection is disposed at a sidewall portion of said connecting section of said ejector means so that said ventilating conduit means communicates with said ejector means at said sidewall portion of said connecting section of said ejector means.

6. The improvement set forth in claim 1 in which said ejector means comprises a convergent section through which effluent from said ducted fan structure enters said ejector means, an outlet section through which effluent from said ducted fan structure and flow from said ventilating conduit means exit said ejector means, and additional sections connecting said convergent section to said outlet section, said additional sections comprising means to cause the effluent passing through said convergent section to create said relatively lower pressure zone.

7. The improvement set forth in claim 6 in which said additional sections comprise a further convergent section downstream of said first-mentioned convergent section and a pressure recovery section downstream of said further convergent section.

8. The improvement set forth in claim 7 in which said outlet section includes a divergent section.

9. The improvement set forth in claim 7 in-which said additional sections are embodied in a single part that also comprises a connecting section that both fits over said first-mentioned convergent section and contains said tee connection.

10. The improvement set forth in claim 1 in which said relatively higher pressure zone is located within said engine bay.

11. The improvement set forth in claim 10 in which said relatively higher pressure zone is at the exhaust manifold of said engine.

12. The improvement set forth in claim 1 in which said engine bay is at the front of the vehicle so that when the vehicle is in forward motion, ram air is forced through the heat exchange structure and ducted fan system.

13. The improvement set forth in claim 6 in which said engine bay is at the front of the vehicle so that when the vehicle is in forward motion, ram air is forced through the heat exchange structure and ducted fan system.

14. The improvement set forth in claim 1 in which said scroll outlet comprises a convergent section, said ejector means comprising a connecting section that fits over scroll outlet including fitting over said convergent section.

* * * * *